Feb. 20, 1968 R. G. CARROLL 3,369,552
PROCESS FOR PRODUCING A TOBACCO SUBSTITUTE
Original Filed May 31, 1966
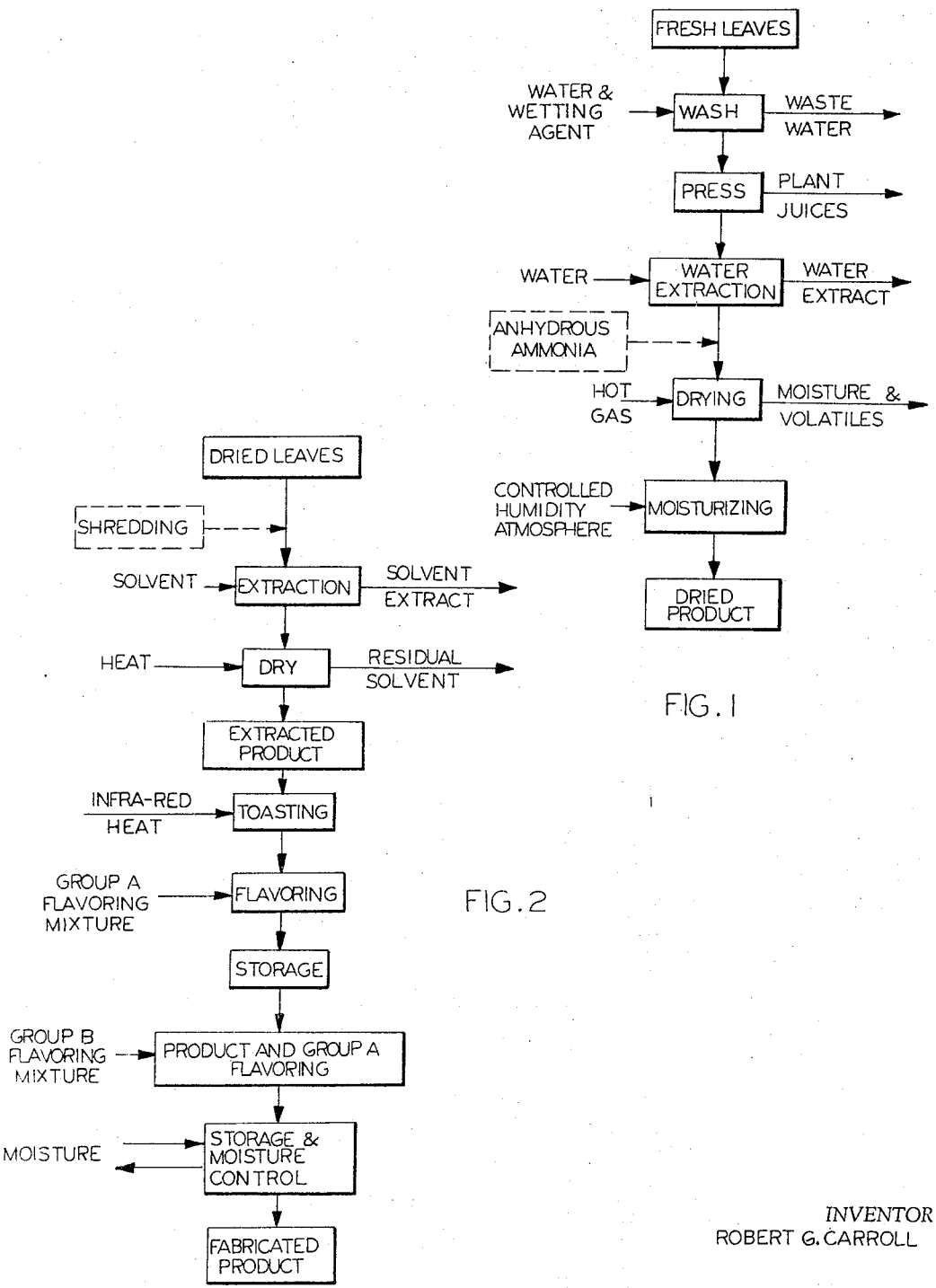
INVENTOR
ROBERT G. CARROLL
BY Paris, Haskell & Levine
ATTORNEYS

United States Patent Office 3,369,552
Patented Feb. 20, 1968

3,369,552
PROCESS FOR PRODUCING A TOBACCO SUBSTITUTE
Robert G. Carroll, West Palm Beach, Fla., assignor, by direct and mesne assignments, to Profair Corporation
Original application May 31, 1966, Ser. No. 553,805. Divided and this application Sept. 23, 1966, Ser. No. 581,631
6 Claims. (Cl. 131—2)

ABSTRACT OF THE DISCLOSURE

The specification describes a process for producing a tobacco substitute from leafy vegetation, and the resultant product. The vegetation is subjected to both a water and organic solvent extraction to remove from the vegetation substantially all of the constituents except the cellulosic and protein and related compound constituents. Between the water extraction and the organic solvent extraction the product is dried to a very low moisture content, and then humidified to a higher moisture content.

---

This case is a division of copending application Ser. No. 553,805, filed May 31, 1966, entitled, Tobacco Substitute.

The present invention relates to a process for producing a tobacco substitute, which may be used in place of tobacco for chewing and for smoking products, such as for cigarettes, cigars and pipes.

Recent medical and statistical studies have emphasized certain health hazards associated with the use of tobacco, and these hazards appear largely to be attributed to the nicotine and tar products contained in the tobacco and its smoke. As a result, many efforts have been made to find substitutes for smoking and chewing tobacco by utilizing other leafy plants either as a complete substitute for tobacco, or in combination with tobacco. These efforts have not met with significant success. In general, it is observed that the substitute leafy materials either lack the flavor sought by tobacco users, or have objectionable and unfamiliar burning odors, or both; and the addition of a small percentage of tobacco to the substitute mateiral does not overcome all of these drawbacks.

It is the primary purpose of the present invention to provide a non-tobacco material, manufactured from leafy plants such as lettuce (*Lactuca sativa*), cabbage, broccoli, collard (*Brassica oleracea* and *Brassica pekinensis*), kohlrabi (*Brassica cauloropa*), spinach (*Spinacea oleracea*), and papaya leaves (*Carica papaya*), which may be used as a smoking or chewing tobacco substitute, and which is free from pungent, acrid, or objectionable burning odors, so as to be acceptable as a tobacco substitute for cigarettes, cigars, and pipes, and may be used to provide an acceptable chewing product.

Basically, the foregoing purpose of the invention is accomplished by stripping the leafy material of substantially all of its ingredients except carbohydrates and nitrogen compounds such as proteins, and then adding appropriate flavoring ingredients to impart taste and aroma to the product commensurate with the tobacco product. As a result this product burns with only minimal quantities of nicotine (if any) and tars, and such tars as are produced are almost entirely sugar tars, that are not considered to be carcinogenic. The stripping of the leafy material is effected in what is essentially two phases. The first phase is a water extraction process, wherein the water soluble ingredients of the material are extracted; and the second phase is an organic solvent extraction, wherein such ingredients as the pigments, chlorophyll, carotene, xanthopyll, and related products are extracted.

The latter phase may include a saponification step to aid in the extraction of the longer chain fats and waxes. The resultant stripped material is then appropriately flavored to form a tobacco substitute which will burn without acrid and pungent odors, and which is substantially free of nicotine and non-sugar tars. It is of course intended that other usual additives will also be employed, such as the usual burning aids and humectants.

It is accordingly the primary object of the present invention to provide a process for producing a tobacco substitute material for smoking or chewing purposes. Other objects of the invention are to provide such a material which is composed essentially of carbohydrates and nitrogen compounds, such as proteins; to provide such a material by stripping from non-tobacco plant leaves the water soluble and oil soluble ingredients thereof; and to provide such a stripped product by solvent extraction of the water soluble and oil soluble ingredients. Other objects and advantages of the present invention will be apparent to those skilled in the art from a consideration of the following detailed description of the invention, had in conjunction with the accompanying drawings, FIGS. 1 and 2, which are flow diagrams of the processing steps hereinafter described.

Referring to FIG. 1, it will be seen that fresh leaves to be processed to form the base material for a tobacco substitute, as for example lettuce leaves, are first washed with water, preferably including a wetting agent or detergent, to remove all foreign matter. They are then pressed to rupture the cell membranes and thereby express most of the plant juices and open the leaves to solvent extraction procedures.

The first extraction phase is a water extraction where the leaves are subjected to a circulating flow of warm or hot water to leach out of the leaves the water soluble components, such as salts and other water soluble ingredients.

This expressed and water leached product is then dried in a flow of hot air, to a moisture content less than that desired, and the dried product is then subjected to a controlled humidity atmosphere to attain the desired moisture content. This dried product is now ready for the organic solvent extraction.

If desired, the nitrogen content of the product can be increased by treating the water extracted leaves with anhydrous ammonia prior to the foregoing drying operation.

The organic solvent extraction is illustrated in the the flow sheet of FIG. 2. The expressed, water extracted and dried leaves may be shredded at this point, if the product is to be used as a cigarette or pipe tobacco substitute, or they may be retained as whole leaves if the product is to be used for chewing or for cigars, either as a whole leaf filler or as a wrapper. In either case, the leaves are subjected to an organic solvent extraction designed to remove the oily and oil soluble constituents of the leaves. In the preferred form of the invention, this extraction is effected in two stages. The first stage comprises exposing the leaves to a circulating solvent such as hexane and acetone, to remove such materials as chlorophyll, xanthophyll, carotene, and vitamins E and K. This extraction is then followed with an ethyl ether extraction, wherein the ether is saturated with citric acid. This second stage extraction is intended to remove the longer chain fats and waves present in the leaves. After the leaves have been exposed to a circulating flow of the ether solvent, the leaves are removed from the solvent and freed of residual solvent by heat.

This dried material is then toasted to a golden brown color, and thereafter treated with appropriate additives depending upon the use to which the material is put. These additives may include flavoring and aroma imparting materials, and humectants and burning aids. Preferably these ingredients include glycerine as a humectant, niacin as a flavor and aroma imparting ingredient, a sweetener such as a sugar, and in the case of a smoking product, potassium nitrate as a burning aid. In addition, it is also found highly desirable to include certain chemicals found in the natural tobacco leaves, either singly or in combination, such as citric acid, malic acid, and pectin. Other special purpose additives may also be included for special effects. For example lobeline sulfate may be included to diminish the user's craving for tobacco, chlorophyll products may be included to deodorize to some extent the product and the smoke, and menthol may be added to form a menthol flavored cigarette. Other specialized flavor and aroma imparting ingredients may also be employed in order to more nearly resemble a true tobacco product—such as prune extract, pulverized husk of black walnut, pulverized cardamon seed, oil of anise, vanilla extract, walnut extract, and oil of eucalyptus.

Considering the foregoing processing steps in greater detail, fresh leaves, as for example lettuce leaves, are prepared for drying by cutting out the large center stems, and the leaves are then washed with water and any of the common wetting agents, such as sodium lauryl sulfate. The leaves are then put between rollers or other suitable pressing machinery and the juices are pressed out at pressures from 30 to 70 p.s.i.a., preferably about 40 p.s.i.a. The pressed leaves are then extracted with water at a temperature of 70 to 95° F., preferably about 80° F., for 1 to 5 hours, preferably about 3 hours, using up to about ½ gallon of water for every pound of fresh leaves put into the pressing operation. During the water extraction step, the water is continuously recirculated through the leaves by a pump.

The pressed and water extracted leaves are then removed from the water extractor and placed on drying trays. Conveniently these trays may be 36 x 36 inches square and 2 inches deep with a screen bottom. Up to one pound of leaf may be placed in each tray, and the trays stacked one on top of another in a drying chamber. A gas such as air at a temperature of from 105° to 145° F., preferably about 115° F., is blown into the top of the drying chamber at the rate of 1,000 to 4,000 cubic feet per minute, preferably about 2,000 cubic feet per minute for every 30,000 pounds of leaf in the drying chamber. The heated gas is pulled down through the drying trays by exhaust fans located along the floor of the drying chamber, and is exhausted outside the drying chamber. The exhaust rate of the drying chamber is required to maintain a drying chamber pressure of from 14.7 p.s.i.a. to 20 p.s.i.a., preferably about 15.2 p.s.i.a. The leaves are retained in this flow of heated gas for 48 to 86 hours, preferably about 72 hours, during which time the moisture content of the leaves is reduced to less than 5 percent by weight.

The drying trays containing the dried leaves are then placed in a controlled atmosphere humidifying chamber where the moisture content of the leaves is raised to between 8 and 15 percent by weight, preferably about 10 percent, at a temperature between 65° F. and 80° F., preferably about 70° F. At the completion of the drying and humidifying phase of the process, the leaves should be tough and pliable, and should be easily shredded or baled.

Alternatively, the drying time may be reduced and a nitrogen compound added to the leaves to improve their taste and burning aroma, by means of an ammonia treatment prior to placing the pressed and water extracted leaves in the drying chamber. This is accomplished by spraying the water extracted leaves with anhydrous ammonia and allowing them to stand for 2 to 6 hours, preferably about 3 hours. From ½ pound to 3 pounds, and preferably about 1 pound of anhydrous ammonia is used for very 10 pounds of fresh leaf put into the pressing operation. After the ammonia treatment the leaves are treated in the drying chamber as above described for 15 to 30 hours, preferably about 20 hours, and then brought to the desired moisture content in a controlled humidity atmosphere.

After completion of the water extraction and drying operations, if the end product of this process is to be used as a tobacco substitute for cigarettes or a pipe smoking product, the dried leaves are shredded. If it is to be used in the form of cigars or as a chewing product, the dried leaves are not shredded but left as they are. If the leaves are to be shredded, this is done just prior to the organic solvent extraction process hereinafter described.

The present invention contemplates several alternative forms of organic solvent extraction of the dried leaves, as set forth in the following illustrative examples:

EXAMPLE 1

The dried leaves are placed in an extraction tank and a solvent mixture of from 75% to 90% hexane and 25% to 10% acetone by volume, preferably about 80% hexane and about 20% acetone, is added to the dried leaves in the amount of from ¾ of a gallon to 4 gallons, preferably about 1½ gallons of solvent mixture per pound of dry leaves. The leaves stay in the extracting solvent for from 40 to 60 hours, preferably about 48 hours, with a pump providing recirculation of the solvent mixture through the leaves for this period of time. At the end of this period of time the solvent mixture is pumped off the leaves and another solvent wash is given the leaves with a clean solvent mixture of the same ingredients, proportions and quantity as the first wash. This second solvent wash stays on the leaves for from 7 to 18 hours, preferably about 12 hours, with recirculating flow of solvent over the leaves as in the first wash. At the end of the second solvent wash the solvent is pumped off the leaves and a third solvent wash is put on the leaves. This third wash comprises a saturated solution of citric acid in ethyl ether. From ¾ to 4 gallons, preferably about 1½ gallons of this solvent solution are used per pound of dry leaves. This third wash remains on the leaves for from 18 to 36 hours, preferably about 24 hours, with recirculating flow of solvent over the leaves during this period of time. The ether wash is then pumped off the leaves, and the extracted leaves are removed from the extraction tank and the residual solvent removed by heat. The first two wash steps of this extraction are intended to remove from the leaf such constituents as chlorophyll, carotene, xanthophyll, and vitamins E and K; while the third wash step functions primarily to remove the long chain fats and waxes from the leaf.

EXAMPLE 2

The first and second wash steps of Example 1 are repeated. In the third wash step, a solvent mixture of from 75% to 90% methyl alcohol and 25% to 10% aqueous ammonia (26° Bé.) by volume, preferably about 80% methyl alcohol and 20% aqueous ammonia, is substituted for the ethyl ether-citric acid solution of Example 1. The methyl alcohol-aqueous ammonia mixture is added in the amount of from ¾ of a gallon to 4 gallons, preferably about 1½ gallons per pound of dry leaves, and is recirculated over the leaves for from 18 to 36 hours, preferably about 24 hours. After this extraction period the solvent wash is pumped off, and a fourth wash of from 80% to 95% methyl alcohol, 10% to 2½% diethanol amine, and 10% to 2½% pyridine by volume, preferably about 90% methyl alcohol, 5% diethanol amine and 5% pyridine, is applied to the leaves in the amount of from ¾ to 4 gallons, preferably about 1½ gallons per pound of dry leaves. This wash remains on the leaves with recirculation for from 7 to 18 hours, preferably about 12 hours. After this period of time the solvent wash is pumped off the leaves and the extracted leaves are removed from the extraction tank and the residual solvent removed by heat. In this process, the first two wash steps perform the same function as the first two steps of Example 1, and the third and fourth steps perform substantially the equivalent extraction as the third step in Example 1.

EXAMPLE 3

The dried leaves are placed in an extraction tank and a solvent mixture of from 80% to 95% aqueous ammonia (26° Bé.), ¼% to 1% sorbitol and 4¾% to 19% diethanol amine by volume, preferably about 90% aqueous ammonia, ½% sorbitol and 9½% diethanol amine, is put into the extractor in the amount of from ¾ to 4 gallons, preferably about 1½ gallons, per pound of dry leaves. This solvent mixture is recirculated over the leaves for a period of from 38 to 52 hours, preferably about 48 hours. At the end of this period of time the solvent mixture is pumped off the leaves, and a second wash is then added to the leaves which comprises a saturated solution of citric acid in ethyl ether, in the amount of from ¾ to 4 gallons, preferably about 1½ gallons, per pound of dry leaves. This wash is recirculated over the leaves for from 7 to 18 hours, preferably about 12 hours, and is then pumped off. The leaves are removed from the extraction tank and the residual solvent removed by heat. In this procedure the ammonia saponifies the fats and waxes, facilitating the extraction of the previously described ingredients.

EXAMPLE 4

The procedure of Example 3 is followed, except a methyl alcohol wash is applied between the two washes there described. This methyl alcohol wash in the amount of from ¾ of a gallon to 4 gallons, preferably about 1½ gallons, per pound of dry leaves is recirculated over the leaves for a period of from 18 to 36 hours, preferably about 24 hours. At the end of this period of time the methyl alcohol is pumped off, and a third wash corresponding to the second wash of Example 3 is applied, i.e., of ethyl ether saturated with citric acid.

EXAMPLE 5

The dried leaves are placed in an extractor and first extracted with a saturated solution of citric acid in ethyl ether, in the amount of from ¾ to 5 gallons, preferably about 1½ gallons, per pound of dry leaves. This solvent wash is recirculated over the leaves for from 38 to 52 hours, preferably 48 hours. This wash is pumped off, and a second wash is then added of from 70% to 85% methyl alcohol, 15% to 10% aqueous ammonia (26° Bé.), 7½% to 2½% diethanol amine and 7½% to 2½% pyridine by volume, preferably about 80% methyl alcohol, 10% aqueous ammonia, 5% diethanol amine and 5% pyridine, in the amount of from ¾ to 4 gallons, preferably about 1½ gallons, per pound of dry leaves. This wash is recirculated for from 18 to 36 hours, preferably about 24 hours, over the leaves and then pumped off. The leaves are then removed from the extraction tank and the residual solvent removed by heat.

Any part of the preceding methods of solvent processing could, of course, be used in place of the entire procedure, but obviously this would effect only a partial extraction of the materials. For certain uses, such as for cigars, some residual oil soluble constituents may be desired. Thus the final aroma and taste of the product can be varied by this means, as well as by the addition to the product of appropriate flavoring mixtures. In any event, after the organic solvent extraction phase of the process is completed, the dried and extracted leaves are placed under infra-red heat lamps and toasted until they are a golden brown.

Various additives are then applied to the foregoing product to impart a taste and aroma simulating that of tobacco when it is burned or chewed and to impart other properties associated with the usual tobacco products. Obviously a very large variety of flavoring mixtures may be employed, and the following specific formulations are exemplary. They are of two general types, one of which uses water as the vehicle, and the other uses ethyl alcohol. It is preferred, although not necessary, to use a flavoring mixture of both types, in which event they are added separately in the amount of from 2% to 20%, preferably 12%, each of the weight of the dry extracted leaves. In the instance of those water vehicle formulations that include non-water soluble solids, such as pulverized cardamom seed and pulverized husk of black walnut, these solids are finely ground and are held in suspension by consant mixing of the flavoring solution prior to applying it to the leaves. Specific examples of flavoring mixtures include the following:

*Aqueous mixtures*

Example A:
  Glycerine—1% (humectant)
  Sorbitol—2% (sweetener)
  Molasses—10% (sweetener)
  Prune extract—5% (flavor)
  Niacin—0.01% (flavor and aroma)
  Citric acid—5% (flavor and aroma)
  Potassium nitrate—6% (burning qualities and aroma)
Example B:
  Glycerine—1% (humectant)
  Niacin—0.01% (flavor and aroma)
  Citric acid—5% (flavor and aroma)
  Malic acid—5% (flavor)
  Maple sugar—8% (sweetener)
  Honey—3% (sweetener)
  Pulverized husk of black walnut—0.1% (flavor and aroma)
  Pectin—1% (flavor and aroma)
  Potassium nitrate—6% (burning qualities and aroma)
Example C:
  Glycerine—1% (humectant)
  Honey—10% (sweetener)
  Niacin—0.01% (flavor and aroma)
  Potassium hydrogen chlorophyllin—0.1% (deodorant)
  Lobeline sulfate—0.001% (allays desire for tobacco)
  Pectin—1% (flavor and aroma)
  Malic acid—8% (flavor)
  Citric acid—3% (flavor and aroma)
  Sorbitol—2% (sweetener)
  Potassium nitrate—6% (burning qualities and aroma)
Example D:
  Maple sugar—10% (sweetener)
  Glycerine—1% (humectant)
  Citric acid—8% (flavor and aroma)
  Pulverized cardamom seed—0.1% (flavor)
  Pulverized husk of black walnut—0.1% (flavor and aroma)
  Lobeline sulfate—0.001% (allays desire for tobacco)
  Potassium nitrate—6% (burning qualities and aroma)
  Potassium hydrogen chlorophyllin—0.1% (deodorant)

*Alcohol mixtures*

Example E:
  Oil of anise—0.1%       ⎫
  Vanilla extract—2%      ⎬ (flavor)
  Menthol crystals—0.007% ⎭
Example F:
  Walnut extract—2%       ⎫
  Oil of eucalyptus—0.1%  ⎬ (flavor and aroma)
  Menthol crystals—0.007% ⎭

The preferred mode of applying these flavoring mixtures to the dried extracted leaves is first to spray them with one of the aqueous flavoring mixtures, and then store the sprayed product at from 60° to 85° F., preferably 70° F., for from 15 to 30 hours, preferably 24 hours. Then, if desired one of the alcohol flavoring mixtures is sprayed on the leaves, and they are again stored for the aforestated time and at said temperatures. The moisture content is then again adjusted to between 8 and 15%, preferably 10%, by means of a controlled humidity atmosphere, and the product may then be put into the form of cigarettes, cigars, pipe smoking compound, or chewing product.

There is thus described specific extraction procedures and additive compositions whereby the principles of the present invention are effected, to produce from leafy vegetation a tobacco substitute for smoking and chewing products. As has been indicated previously, on following these procedures, the base material, prior to treatment with the additives, is composed essentially of protein and related nitrogen compounds, and carbohydrates. Analysis of typical products produced in accordance with these procedures shows a composition of 9%–22% protein and related nitrogen compounds, 76%–90% carbohydrates, and 1%–2% plant acids and salts. This product is substantially free of fat or oil soluble constituents, nicotine and coumarin, and has a reduced amount of tar, aldehydes, and phenols in the products of combustion as compared with tobacco. Furthermore, the tar that does exist in the combustion products is almost exclusively a sugar tar.

Obviously, numerous variations in the exemplary descriptions of the invention will be apparent to those skilled in the art. For example, it is obvious that different solvents known to be equivalent to those disclosed will be apparent to those skilled in the art. Also, additive materials other than those described may be employed. Accordingly, such variations and modifications of the disclosed process as are embraced by the spirit and scope of the appended claims are contemplated as being within the purvue of the present invention.

What is claimed is:

1. A method of producing a smoking and chewing tobacco substitute base material characterized by being substantially free of fat or oil soluble constituents, nicotine and coumarin and having a reduced amount of tar, aldehydes and phenols in the products of combustion as compared with tobacco comprising the steps of pressing leafy vegetation to express the juices therefrom and to rupture the cell membrane walls thereof, subjecting the expressed residuum to a water extraction, to remove substantially all the water soluble ingredients therefrom, drying the water extracted residuum to a moisture content of less than about 5%, humidifying the dried material to a moisture content of between about 8 and 15%, and subjecting the humidified material to an organic solvent extraction to remove therefrom substantially all of the chlorophyll, carotene, xanthophyll, pigmentary, vitamin, and oil soluble constituents thereof, whereby the residuum consists essentially of the cellulosic and protein and related nitrogen compound components of said leafy vegetation; said residuum in its final form having substantially the same leafy character as that of the leafy vegetation from which it was derived.

2. A method as set forth in claim 1, and including the step of toasting the extracted residuum.

3. A method as set forth in claim 2, and further including the application to the toasted material of an additive mixture of materials including an humectant, a flavor and aroma producing constituent, a burning aid, and a sweetener.

4. In the process of producing a tobacco substitute which is derived from non-tobacco leafy vegetation by subjecting said leafy vegetation to a water extraction to remove therefrom substantially all the water soluble ingredients and to an organic solvent extraction to remove therefrom substantially all of the chlorophyll, carotene, xanthophyll, pigmentary, vitamin, and oil soluble constituents while retaining therein most of the natural protein and related nitrogen compound constituents, the improvement which comprises drying said vegetation between said two extractions to a moisture content of less than about 5% and then humidifying said dried product to a mosture content of between about 8 and about 15%, whereby the residuum consists essentially of the cellulosic and protein and related nitrogen components of said leafy vegetation, said residuum in its final form having substantially the same leafy character as that of the leafy vegetation from which it was derived.

5. The process set forth in claim 4, and including the step of toasting the extracted residuum.

6. The process as set forth in claim 5, and further including the application to the toasted material of an additive mixture of materials including a humectant, a flavor and aroma producing constituent, a burning aid and a sweetener.

References Cited

UNITED STATES PATENTS

| | | | |
|---|---|---|---|
| 1,577,768 | 3/1926 | Smith. | |
| 2,048,624 | 7/1936 | Roselius | 131—143 |
| 2,576,021 | 11/1951 | Koree | 131—2 |
| 2,930,720 | 3/1960 | Finberg | 131—17 |
| 3,003,895 | 10/1961 | Grunwald | 131—17 |
| 3,096,773 | 7/1963 | Neukomm et al. | 13—143 |
| 3,106,209 | 10/1963 | Torigian | 131—2 |
| 3,112,754 | 12/1963 | Diaz | 131—2 |
| 3,255,760 | 6/1966 | Selke | 131—8 |
| 3,298,378 | 1/1967 | Stevens et al. | 131—140 |
| 3,323,524 | 6/1967 | Shamberger | 131—2 |

SAMUEL KOREN, *Primary Examiner.*

MELVIN D. REIN, *Examiner.*